United States Patent [19]

Gledhill et al.

[11] Patent Number: 5,923,666
[45] Date of Patent: Jul. 13, 1999

[54] DECODING CARRIERS ENCODED USING ORTHOGONAL FREQUENCY DIVISION MULTIPLEXING

[75] Inventors: Jeff Gledhill; Santosh Anikhindi, both of Hampshire, United Kingdom

[73] Assignee: NDS Limited, West Drayton, United Kingdom

[21] Appl. No.: 08/735,868

[22] Filed: Oct. 23, 1996

[30] Foreign Application Priority Data

Oct. 24, 1995 [GB] United Kingdom .................. 9521739

[51] Int. Cl.⁶ ...................................................... H04J 1/00
[52] U.S. Cl. ........................................... 370/480; 375/341
[58] Field of Search ..................................... 370/203, 206, 370/207, 208, 343, 480, 503, 516, 481, 482, 483, 484; 375/260, 262, 340, 341; 371/69.1, 71

[56] References Cited

U.S. PATENT DOCUMENTS

| | | | |
|---|---|---|---|
| 4,166,979 | 9/1979 | Waggener | 375/376 |
| 4,881,241 | 11/1989 | Pommier et al. | 375/260 |
| 5,157,694 | 10/1992 | Iwasaki et al. | 375/327 |
| 5,278,871 | 1/1994 | Rasky et al. | 375/343 |
| 5,440,544 | 8/1995 | Zinser, Jr. | 370/319 |
| 5,483,529 | 1/1996 | Baggen et al. | 370/484 |
| 5,550,812 | 8/1996 | Philips | 370/203 |
| 5,608,764 | 3/1997 | Sugita et al. | 375/344 |
| 5,684,811 | 11/1997 | Doran | 371/43 |
| 5,694,389 | 12/1997 | Seki et al. | 370/208 |

FOREIGN PATENT DOCUMENTS 63-156444 6/1988 Japan.

OTHER PUBLICATIONS

V. Mignone, et al., IBC, *A New Channel Estimation Method to Improve the Spectrum Efficiency in Digital Terrestrial Television Systems*, 95 International Broadcasting Convention, CD3–OFDM, abstract, Conference Publication No. 413, Sep. 1995, pp. 122–128.

R. Lassale, et al., *Principle of Modulation and Channel Coding for Digital Broadcasting for Mobile Receivers*, EBU Review—Technical No. 224, Aug. 1, 1987, pp. 168–190.

*Primary Examiner*—Chi H. Pham
*Assistant Examiner*—Kwang B. Yao
*Attorney, Agent, or Firm*—Proskauer Rose LLP

[57] ABSTRACT

This invention relates to decoding symbols in the form of modulated carriers which are encoded using orthogonal frequency divsion multiplexing. The modulated carriers are supplied to a decoder which is preferably a Viterbi decoder. The decoder symbols are then recoded and passed to a comparator where they are compared with the incoming modulated carriers to locate errors between each recoded symbol and the corresponding modulated carrier symbol. The error rate for each carrier is derived by a counter and the indications of error rate and the modulated carriers are used to address entries in a look up table from which a decoder decodes the symbols represented by the modulated carriers.

4 Claims, 1 Drawing Sheet

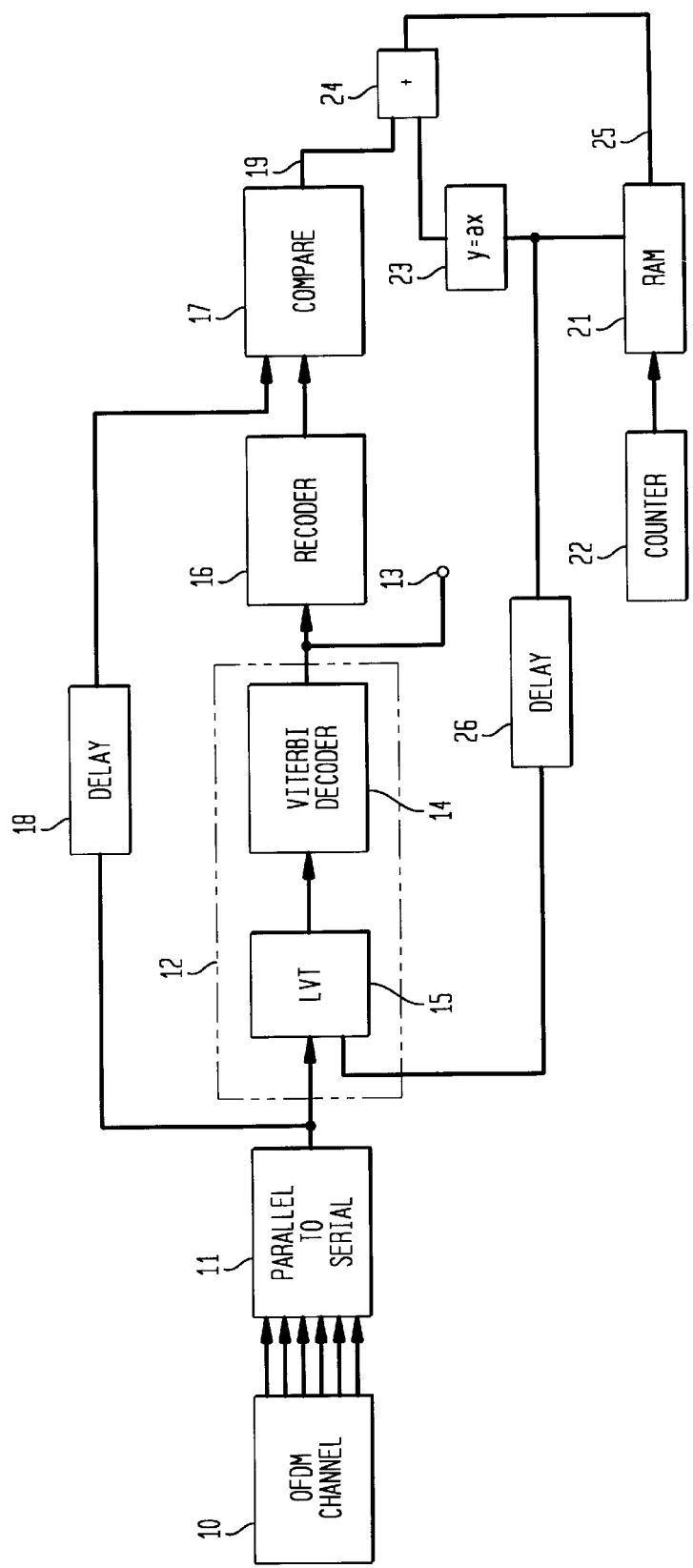

DECODING CARRIERS ENCODED USING ORTHOGONAL FREQUENCY DIVISION MULTIPLEXING

FIELD OF THE INVENTION

The present invention relates to the decoding of symbols transmitted to a receiver which receives the symbols in the form of modulated carriers encoded using orthogonal frequency division multiplexing. At the receiver, the encoded symbols are decoded by a suitable decoder such as a Viterbi decoder.

BACKGROUND OF THE INVENTION

A problem in decoding the modulated carriers occurs if the carriers are subject to fading or interference. The problem is particularly acute if fading or interference affects the carriers over a narrow band of frequency since, although there may a negligible effect on the majority of carriers, it causes a large effect on a few carriers. The problem may be the result of frequency selective fading caused by multipath interference or may be the result of narrow band interference caused by analog television signals.

The use of patterns of erasures to increase the rate of error correction of Viterbi decoded convolutional codes is already known. This technique, known as puncturing, uses short repetitive sequences of erasures and achieves very good performance. Simulations using random patterns of erasures for puncturing give results that are only slightly inferior to the best known repetitive sequences.

Rather than simply marking a symbol as erased or not erased, an error probability can be assigned to the symbol to represent information about the reliability of the received symbol. This technique is widely used in the so-called soft decision Viterbi decoder and in its standard from the information on the reliability of the symbol is derived solely from the quality of the received symbol, usually as a function of its Euclidean distance from a decision threshold.

In an extended form of the Viterbi decoder, soft decision information is derived from the state of the channel. One technique is to determine the signal to noise ratio for each carrier and to use this information to derive a measure of the error probability for the symbols assigned to that carrier. One method for determining this error probability is to use a null symbol, during which there is an interruption in the transmission, and to allow the receiver to measure the spectral response of the noise and interference and thereby infer the interference power and hence error probability for each carrier.

A problem with the use of null symbols is that the data rate of the transmission is degraded by the need to accommodate the null symbols.

SUMMARY OF THE INVENTION

According to the present invention there is provided a method of decoding incoming modulated carriers encoded using orthogonal frequency division multiplexing and representing a stream of encoded symbols, the method comprising the steps of; supplying the modulated carriers to a decoding means effective to decode the symbols represented thereby, recoding the decoded symbols, comparing the incoming modulated carriers with the recoded symbols to locate errors between each recoded symbol and the corresponding modulated carrier symbol, deriving an indication of the error rate for each carrier and, applying the indication of error rate to the decoding means to effect decoding of each carrier symbol by reference to the modulation of the carrier combined with the indication of error rate for the carrier.

According to the present invention there is now provided apparatus for decoding incoming modulated carriers encoded using orthogonal frequency division multiplexing and representing a stream of symbols, the apparatus comprising; decoding means having an input to receive the modulated carriers and being effective to decode the symbols represented thereby, a recoder to recode the decoded symbols from the decoding means, a comparator to compare the incoming modulated carriers with the recoded symbols and to signal the location of errors between each recoded symbol and the corresponding modulated carrier symbol, and means to derive from the comparator an indication of the error rate for each carrier, the decoding means having an input to receive the indication of error rate for each carrier and being effective to decode each carrier symbol by reference to the modulation of the carrier and by reference to the indicated error rate for the carrier.

Preferably, the decoding means comprise a look up table, entries to which are addressed by the carriers and the indications of error rate, and a decoder effective to decode the symbols represented by the modulated carriers from the entries addressed in the look up table.

BRIEF DESCRIPTION OF THE DRAWINGS

The invention will now be described, by way of example, with reference to FIG. 1 which shows a system embodying the present invention for decoding modulated carriers encoded using orthogonal frequency division encoding.

DETAILED DESCRIPTION OF THE INVENTION

A channel 10 supplies in parallel a plurality of modulated carriers encoded using orthogonal frequency division multiplexing. The carriers are received by a de-interleaver 11 which converts the carriers from parallel to serial format to represent a stream of encoded symbols. A decoding means 12 is connected to receive the stream of symbols and is effective to decode the symbols for supply to an output terminal 13. The decoding means consist of a Viterbi decoder 14 and means to store a look up table 15. The purpose of the look up table will be explained.

The output from the Viterbi decoder 14 is supplied to a recoder 16 which recodes the symbols decoded by the Viterbi decoder and supplies the recoded symbols to one input to a comparator 17. Another input to the comparator 17 is supplied with the incoming carriers representing the input stream of encoded symbols by way of a delay means 18. The delay means 18 delay the stream of encoded symbols passed therethrough by a delay period sufficient to match the delay through the look up table means 15, the Viterbi decoder 14 and the recoder 16. As a result, each symbol in the incoming stream from the de-interleaver 11 is passed through the delay means 18 to be compared with the recoded version of the same symbol supplied by the recoder 16. The comparator 17 is effective to signal to an output terminal 19 each error arising from a difference in the coding of the symbol supplied by way of the delay means and the coding of the corresponding symbol supplied by the recoder 16.

The error signals at the terminal 19 are passed to a bit error counter. The bit error counter includes a RAM 21 which stores a series of n bit numbers associated respectively with the bit positions in a received symbol. The numbers in the RAM 21 are addressed sequentially by a counter 22 which steps through the RAM addresses so that all the n bit numbers are addressed over a time interval of a received symbol. The RAM has an output connected to a multiplier 23 which supplies one input of an adder 24. The other input to the adder 24 is the output from the comparator 17. The adder supplies an input 25 of the RAM 21.

Each number addressed in the RAM is multiplied by a factor a in the multiplier 23, the value of a being less than 1. The output from the multiplier 23 is returned to the same RAM address by way of the adder 24. In the event of no error, the value returned to the RAM by way of the adder 24 is simply the number addressed in the RAM multiplied by the value a. The result is stored back in the RAM 21.

In the event that the comparator 17 detects any error, the number addressed in the RAM is multiplied by the value a and the result is added, in the adder 24, to a number b before being stored back in the RAM. It can be shown that for a long term error probability p, the output from the RAM 21 is given by the expression;

$$\frac{b}{(1-ap)} - b$$

The output from the RAM 21 is supplied through a delay means 26 to the look up table 15. The delay means 26 impose a delay equal to the length of one received symbol so that the numbers from the RAM 21 correspond in time to the bit positions of the next received symbol in the stream of encoded symbols from the de-interleaver 11.

The look up table 15 combines the encoded symbol with the bit error rate information form the RAM 21 to generate the input to the Viterbi decoder 14. The combined input to the Viterbi decoder 17 is exactly the information required by the decoder 17 to optimally decode the received stream of encoded signals. The estimation of the performance of the channel 10 is thus recovered directly from the received symbols rather than by inference from other channel measurements and without the use of special signals such as a null symbol.

We claim:

1. A method of decoding modulated carriers encoded using orthogonal frequency division multiplexing to produce a steam of encoded symbols, the method comprising the step of:

supplying said modulated carries to a decoded effective to decode said encoded symbols to produce decoded symbols, recoding said decoded symbols to produce recoded symbols;

comparing said modulated carriers with said recoded symbols to locate errors between each recoded symbol and a corresponding encoded symbol, deriving an indication of an error rate for each of said modulated carriers, and applying said indication of error rate to said decoder to effect decoding of each encoded symbol by reference to the modulation of one of said modulated carriers combined with said indication of error rate for one of said modulated carriers, wherein said indication of error rate and said modulated carriers are used to address entries in a look up table from which said decoder decodes said encoded symbols represented by said modulated carriers.

2. The method as claimed in claim 1, wherein said decoder comprises a Viterbi decoder.

3. Apparatus for decoding modulated carriers comprising a stream of orthogonal frequency division multiplex encoded symbols and representing said stream of encoded symbols, the apparatus comprising:

a decoder having an input to receive said modulated carriers and being effective to decode said encoded symbols represented thereby to produce decoded symbols, a recoder to recode said decoded symbols from said decoder to produce recoded symbols, a comparator to compare said modulated carriers with said recoded symbols and to signal the location of errors between each recoded symbol and a corresponding encoded symbol and to output an indication of an error rate for each carrier, the decoder having an input to receive said indication of said error rate for each carrier and being effective to decode each of said encoded symbols by reference to the modulation of one of said modulated carriers and by reference to said indication of said error rate for said modulated carriers, and the decoder having a look up table, entries to which are addressed by said modulated carriers and said indication of said error rate and being effective to decode the symbols represented by said modulated carriers from said entries addressed in said look up table.

4. Apparatus as claimed in claim 3, wherein said decoder comprises a Viterbi decoder.

* * * * *